March 4, 1958 G. A. HEMPEL 2,825,129
TELEVISION CONE CONSTRUCTION
Filed Jan. 20, 1951 4 Sheets-Sheet 1
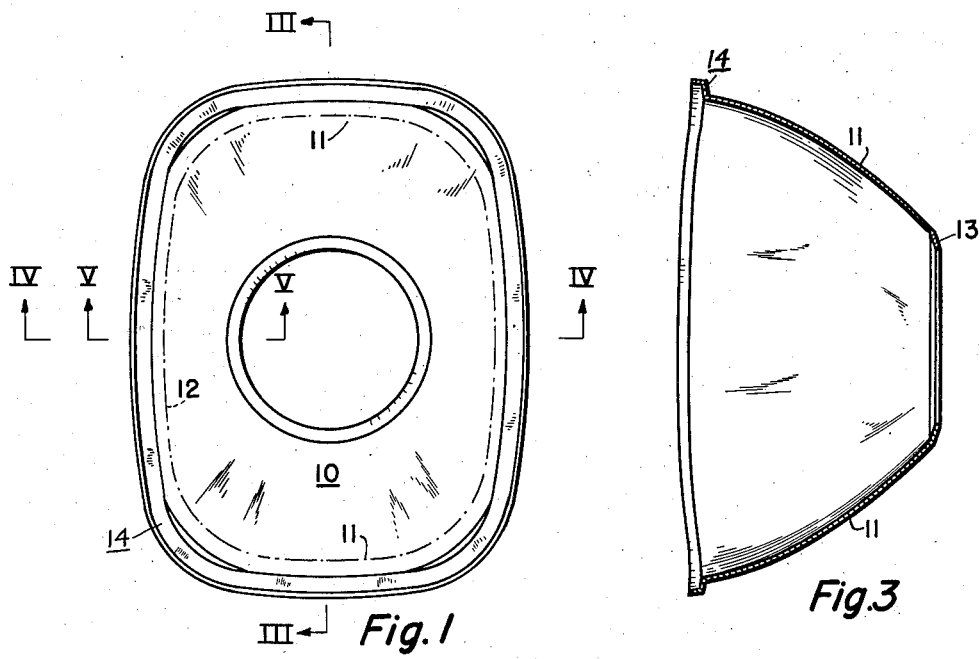
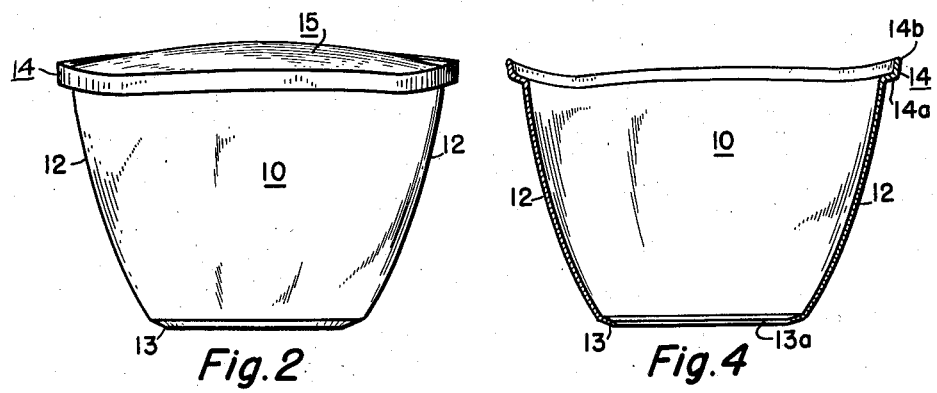
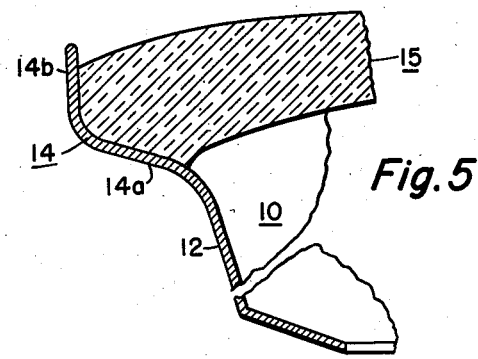
INVENTOR.
Gustav A. Hempel
BY Green, McCallister and Miller
HIS ATTORNEYS

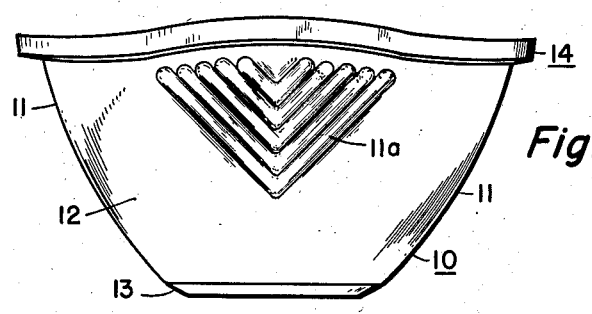
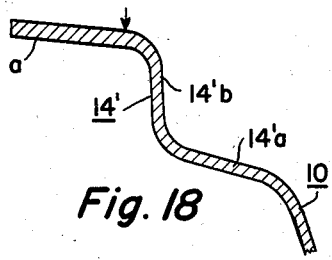
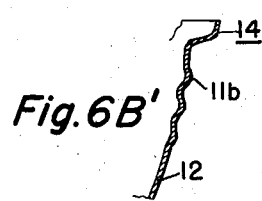
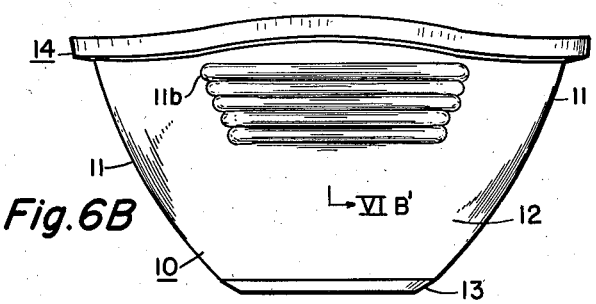
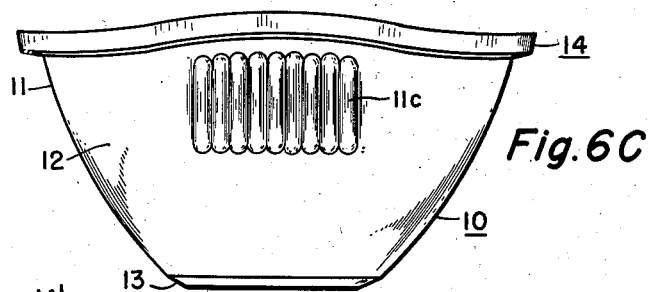
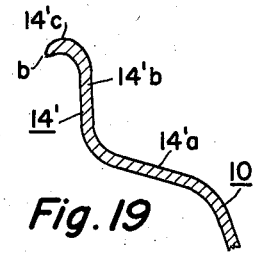
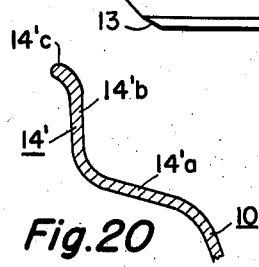
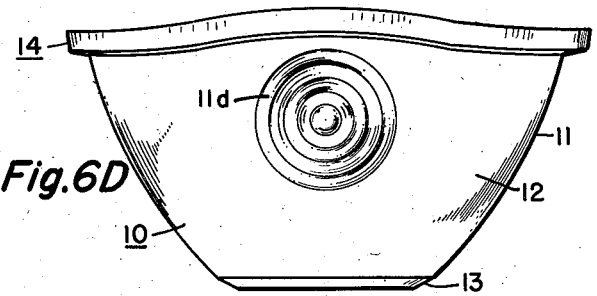
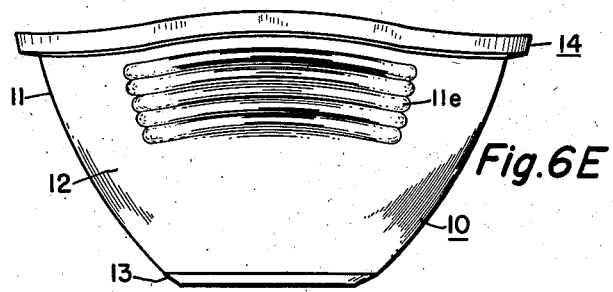

March 4, 1958  G. A. HEMPEL  2,825,129
TELEVISION CONE CONSTRUCTION
Filed Jan. 20, 1951  4 Sheets-Sheet 3

INVENTOR.
Gustav A. Hempel
BY Green, McCallister and Miller
HIS ATTORNEYS

March 4, 1958     G. A. HEMPEL     2,825,129
TELEVISION CONE CONSTRUCTION
Filed Jan. 20, 1951     4 Sheets-Sheet 4

INVENTOR.
Gustav A. Hempel
BY Green, McCallister and Miller
HIS ATTORNEYS

United States Patent Office 2,825,129
Patented Mar. 4, 1958

2,825,129

TELEVISION CONE CONSTRUCTION

Gustav A. Hempel, Pittsburgh, Pa., assignor to McDowell Manufacturing Company, a corporation of Pennsylvania Application January 20, 1951, Serial No. 206,980

2 Claims. (Cl. 29—539)

This invention relates to rectangular metal television tube cones and to procedure for making them.

At the present time, television tubes both round and rectangular, have been successfully made entirely of glass where the size of the face plate or viewing portion does not exceed about 17 inches. Where larger, it is desirable to employ a metal cone in making the tube to provide it with requisite strength characteristics and to reduce the weight, as very thick glass must be employed. A television tube is under considerable stress, since it has an internal vacuum close to zero pounds absolute, or in other words, atmospheric pressure less 14.7 pounds at sea level. As a result, when a television tube collapses it does so inwardly. This is known as an "implosion." Its viewing portion or face plate is made of highly stressed glass which, like the Geneva drop, will shatter if scratched on any edge. One of the principle disadvantages of the all glass type of tube is the inherent danger in its use.

The metal cone is made up of a special stainless type of steel, such as Allegheny Ludlum's "Telemet" or Armco's "No. 430"; it is understood that this steel contains about 12 to 18 percent chromium and no nickel.

Heretofore standard television tubes have been of a circular or round cone type. Thus, it has been customary to spin a metal blank into a cone shape, and then to spin-out its glass face-plate-receiving upper lip, as well as its bottom lip. This spinning process decreases the thickness of the side walls and provides a desired strengthening of the cone at the upper and lower lip. Some anneals have to be effected to remove hardening which results from cold working of the metal during the spinning. In addition, after it has been formed and just prior to "sealing in" the glass components, it is in some cases customary to subject the cone to a dry hydrogen or "atmospheric" anneal at about 900° C. for ten minutes; this is called an oxidizing anneal. Such anneal is for the purpose of bringing chromium as an oxide to the surface and produces a greenish chromium oxide finish to which the glass will fuse more readily. The steel is selected from the standpoint of similarity of its expansion and contraction characteristics with respect to that of the glass components, in order that it can be properly bonded and remain so during the life of the tube.

In applying the glass face plate, it is first placed in position within the top lip of the metal cone. Heat is then applied to the under-side of this lip, until the edge of the glass is melted and bonded in position. The temperature is such that the steel is at a red heat and the glass is actually molten around the lip of the cone. Air pressure admitted inside the cone and carefully controlled, prevents the plate from collapsing into the cone. It is essential, of course, that the seal be complete and air tight.

The so-called round television tube has one particular disadvantage. The camera takes a rectangular picture and it is customary in most television sets to frame the transmitting picture to a rectangular shape which may be partially inscribed by the circular edge of the face plate. As a result, a portion of the picture as transmitted may be lost, particularly about bounding circular corners of the face plate. In some of the older television receivers, in order to provide a rectangular visual picture, the rectangle is circumscribed within the bounding circular edge of the tube face, thereby presenting "dead" spacing to the eye and somewhat reducing the size of the picture. The round cone also requires a larger cabinet which is objectionable to the manufacturers from a cost standpoint and to the user from a space standpoint. It is for these reasons that a rectangular viewing tube is desirable. However, difficulties have arisen in endeavoring to make a cone of this shape which will have the desired characteristics and which will not require too heavy a gauge metal due to the high per pound cost of the alloy used.

The stainless steel now used because of its special alloy content, it very expensive, e. g., about 50 cent a pound as compared to 5 cents a pound for glass. Thus, from a cost standpoint, the gauge of the metal used is highly important. It is also important from the standpoint of the total weight of the television picture tube.

Although, as above pointed out, it has been relatively easy to make a satisfactory circular cone of metal, considerable difficulty has been encountered in endeavoring to produce a so-called rectangular cone by reason of its peculiar shape, the necessity for complying with relatively rigid electrical, strength and other requirements, and also in view of the need for employing as light a gauge metal as possible. There have been several attempts to solve this problem. For example, a circular cone was formed, as heretofore, by spinning the metal into a conical shape, leaving the upper and lip areas heavy and finally, forming it in a press into a rectangular shape. Particular difficulty was encountered in endeavoring to make the face-plate-receiving upper lip into a requisite shape to receive the glass face plate, in properly shaping the "neck end" or lower lip at the opposite end of the tube, in fusing the glass and especially, in preventing a breaking-away of the metal cone from the glass after the bonding operation. Also, trouble was encountered by reason of the fact that in spinning the cone a definite change results in the grain structure of the metal. Thus, when the circular cone is formed into a rectangular cone and subsequently heated to produce the chromium oxide surface and particularly, when the lip is heated-up to make the glass-to-metal seal, the rectangle tends to return to its original circular shape. This tendency causes great difficulty in getting an effective and stable bond between the glass and the metal, distorts the rectangle from the ultimate desired shape, particularly if the cone has to be salvaged and re-used, and set up stresses and strains which can cause the tube to fail. Another manufacturer endeavored to reverse the above process by first press-forming a rectangular shape for the larger end of the cone and then, spinning the balance of the metal into a circular shape. This cone has not been favorably received by the tube manufacturers as it does not result in an acceptable and interchangeable final shape.

Also an attempt was made to stamp out a metal cone, but this also was unsuccessful and was abandoned. In striving to solve the problem, I first tried making a rectangular cone by taking two metal pieces, forming them and then welding them together along their edges to form a unitary cone. This produced a rather rough shape and did not conform too well to requirements as to size, contour and surface characteristics. Finally, after numerous experiments, and a thorough evaluation of important factors involved, I have been able to provide a highly satisfactory solution to the problem.

It has thus been an object of my invention to solve the above-mentioned problem in a practical manner;

Another object has been to develop a simple, relatively inexpensive method of making metal television cones of a rectangular shape such that the resultant product will conform to the exacting, rigid requirements of the art;

A further object of my invention has been to devise a new and improved form of rectangular metal television cone;

These and many other objects of my invention will appeal to those skilled in the art from the description of my invention and the appended claims.

In the drawings,

Figure 1 is a top plan view of a rectangular metal television cone constructed in accordance with my invention;

Figure 2 is an end view in elevation of the cone of Figure 1;

Figure 3 is a side sectional view taken along the line III—III of Figure 1;

Figure 4 is an end sectional view in elevation taken along the line IV—IV of Figure 1;

Figure 5 is a greatly enlarged sectional detail in elevation showing a glass face plate in a mounted or bonded relationship with respect to its upper lip and is taken along the line V—V of Figure 1;

Figures 6A, 6B, 6C, 6D and 6E are sectional details showing methods of reinforcing the side walls of the cone of Figures 1 to 4, all in accordance with my invention;

Figure 7:
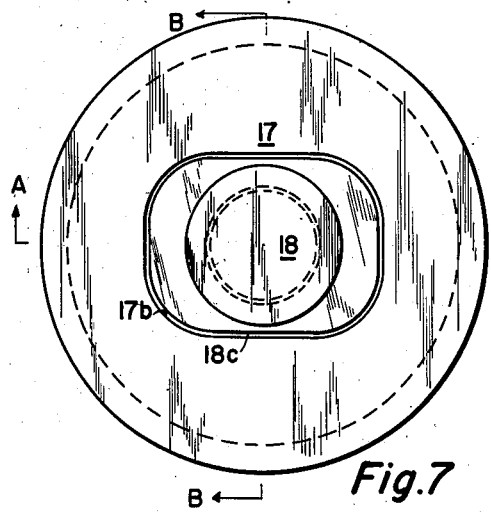
Figure 9A:
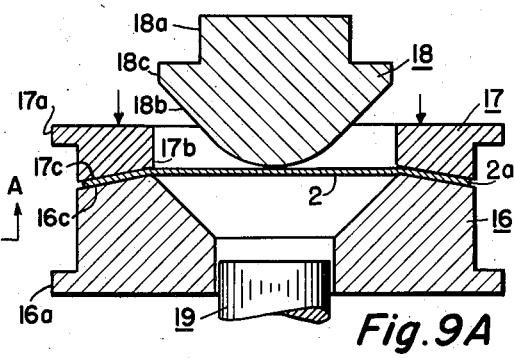
Figure 9B:
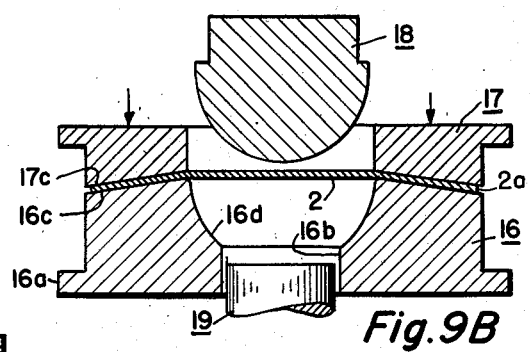
Figure 8A:
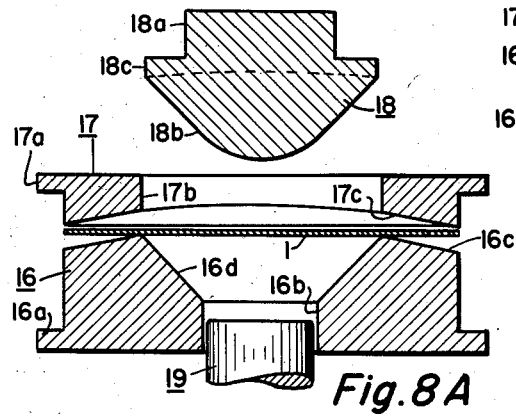
Figure 10A:
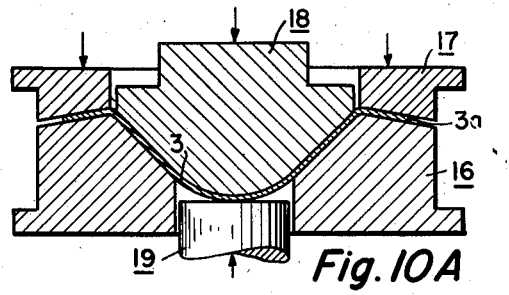
Figure 8B:
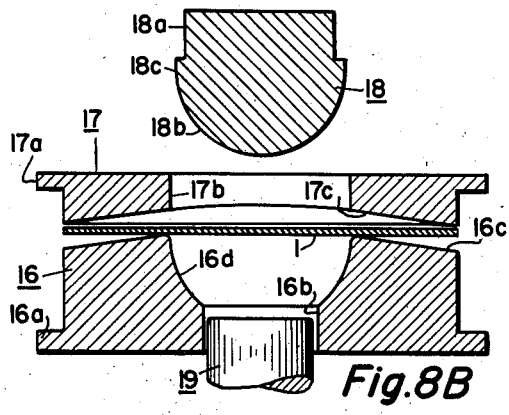
Figure 10B:
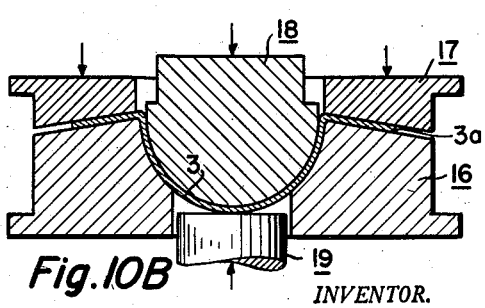
Figure 11:
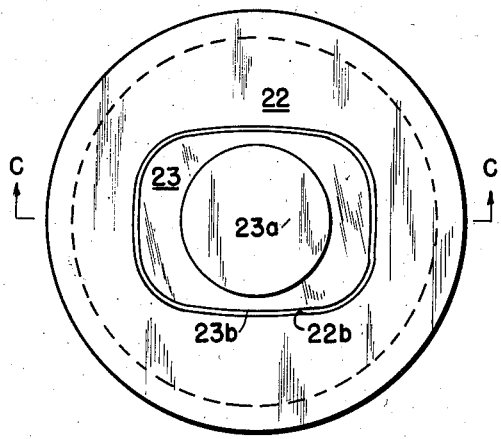
Figure 14:
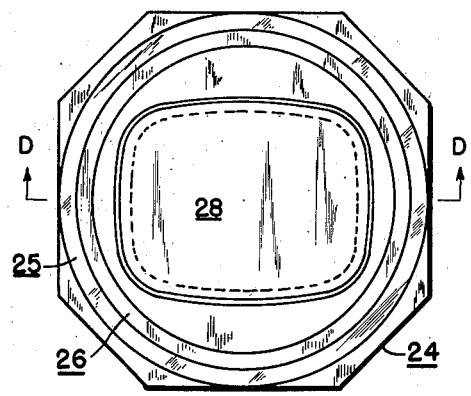
Figure 12:
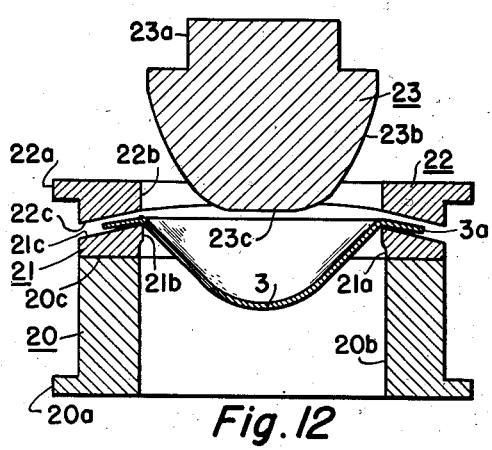
Figure 15:
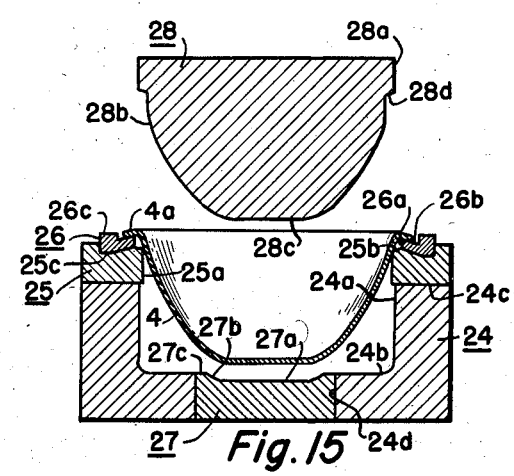
Figure 13:
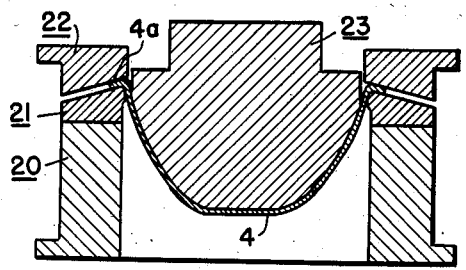
Figure 16:
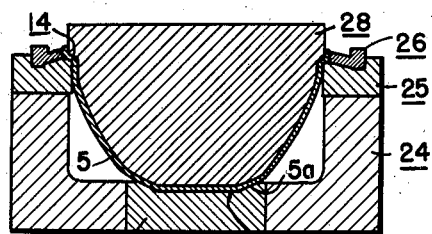
Figure 17:
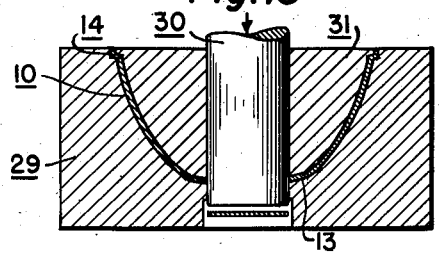

Figure 6B′ is a fragmental section through the wall of the cone of Figure 6B;

Figure 7 is a top plan view of an apparatus for carrying out a first drawing operation upon a metal blank in accordance with procedure of my invention;

Figure 8A is a sectional view in elevation taken along the line A—A of the apparatus of Figure 7 and showing a metal blank in an initial position with respect thereto;

Figure 8B is a view similar to Figure 8A but is taken along the line B—B of Figure 7, at right angles to Figure 8A;

Figure 9A is a view somewhat similar to Figure 8A and is taken along A—A of Figure 7, but it illustrates a first step of the first drawing operation wherein hold down pressure or force is applied to the blank;

Figure 9B is a view similar to Figure 9A, but is taken along the line B—B of Figure 7;

Figure 10A is taken along the line A—A of Figure 7 and illustrates a second step in the first forming operation, while Figure 10B illustrates the same step, but is taken along the line B—B of Figure 7;

Figure 11 is a top plan view of a second apparatus employed in carrying out a second drawing operation of my procedure;

Figure 12 is a sectional view in elevation taken along the line C—C of Figure 11 and shows the preliminary shape resulting from the first drawing operation in position with respect to the apparatus of Figure 11 for carrying out the second drawing operation of my procedure;

Figure 13 is a section taken along the line C—C of Figure 11 and illustrating the completion of the second drawing operation;

Figure 14 is a top plan view of a third apparatus constructed in accordance with my invention to carry out a third or forming operation of my procedure;

Figure 15 is a sectional view in elevation taken along the line D—D of Figure 14 and showing a previously drawn shape in position in the forming apparatus of Figure 14;

Figure 16 is a section taken along the line D—D of Figure 14 and illustrating a completion of the forming operation as effected by the apparatus disclosed;

Figure 17 is a sectional view in elevation illustrating a final piercing operation whereby the bottom lip is provided to produce the final shape shown in Figures 1 and 2.

Figures 18 to 20, inclusive, are fragmental sections through the wall of a cone formed in accordance with my invention and that has a modified form of top lip; these figures illustrate steps employed in providing a stiffened edge for the top lip.

I have been able to solve the problem previously discussed by effecting a series of metal stamping operations which involve drawing and forming a sheet or strip metal blank.

I determined that a solution to the problem was further complicated by the necessity of keeping the metal blank to as thin a gauge as possible, so that tests of the completed cone would correspond to those which had heretofore been run on circular cones of substantially the same size. Since draws are involved, the difficulty of obtaining the proper shape and particularly, one having the requisite strength characteristics, was aggravated.

In illustrating my procedure, I have shown a first drawing operation which is relatively shallow as far as the somewhat spherical center of the blank is concerned and which also forms a top flange with about a 10° angle. In the next drawing operation, the top flange is given about a 13° angle and the central depth of the shape is further enlarged to provide a cone shape. After the drawing operations have been completed, the lip for the face plate and the bottom round lip are formed on the cone shape. As a final step, a circular section is pierced out from the residual center metal at the bottom of the cone. The final shape or product is illustrated in Figures 1 to 4, inclusive.

The product, as produced in accordance with the procedure of my invention can be produced from a gauge of metal that is less than that of a substantially corresponding size of a circular cone. It should be noted that a so-called 17 inch rectangular cone represents the approximate dimension taken diagonally across the edge of the top lip. The resultant product has excellent strength by reason of the novel procedure employed, and can be provided without weakening the unitary construction and with a minimum number of rejections. Although I do not form a heavy band about the cone as is done in the spinning procedure, I have shown (see Figures 6A, etc.) how the relatively flat or planar sides of the rectangular cone can be reinforced, if desired, to further strengthen the cone and without recourse to a heavy gauge metal. That is, I have determined that such sides which may be termed the major planar side wall portions of the shape, are subjected to the greater stress and thus, would normally represent the weakest portion of a unitary structure.

A highly important advantage of a cone product produced in accordance with my invention is that no difficulty is encountered in obtaining the rounded rectangular shape of the lip for receiving the face plate, in bonding the glass, or in setting up strains and stresses in the cone (which would of course ordinarily be imparted to the glass by reason of any tendency for the cone to distort under heat employed in the sealing operation). I preferably utilize two or three stress anneals between the manufacturing steps.

Referring particularly to the first sheet of my drawings, the rectangular cone shape or product 10 has a pair of relatively narow, opposed end walls 11 which are integrally curved into and connected to opposed, substantially flat or planar side walls 12 of greater or major extent. The shape 10 also has a top lip 14 for receiving a glass face plate 15. It will be noted that the upper rim edge of the lip is rounded and that the lip has a transversely-outwardly and slightly-inwardly extending portion 14a which is integral with an upwardly-projecting portion 14b. The glass plate 15, as shown in Figure 5 rests upon the portion 14a with its edge against the portion 14b and is bonded to the flange 14 by heat applied to the underside portion 14a.

In Figures 6A to 6E, inclusive, I have illustrated reinforcing ribs or corrugations 11a of chevron design, horizontal corrugations 11b, vertical corrugations 11c, concentric circular corrugations 11d, and sine wave or curvilinear corrugations 11e. These portions may be employed individually, or in combination, on the major width sides 12 to further strengthen the construction, although I have found that they are usually not necessary. They make possible the use of a further lightened gauge of metal. Figure 6B' illustrates how these corrugations move "in" and "out." Such reinforcing portions have been formed in the sides 12 by the utilization of a pair of dies or a die and a punch having the requisite formation. That is, the shape of Figure 1 may thus be further processed.

In Figures 7 to 17, inclusive, I have illustrated procedure for forming the above described rectangular metal television cone. Referring particularly to Figures 7 to 10B, inclusive, I illustrate the first drawing of my procedure. The apparatus used has been somewhat diagrammatically illustrated. It includes a draw die 16, a blank holder 17, a draw punch 18 and a reciprocal knockout 19. The draw die 16 has a mounting flange 16a, a draw bore 16b, a shaped draw cavity 16d and an outwardly-declining draw face 16c. It will be noted that a flat metal blank 1 is positioned upon the apex formed by the surfaces 16d and 16c for effecting the operation, see Figures 8A and 8B.

The blank holder 17 has a mounting flange 17a for positioning it in a press, a bore 17b and an outwardly-declining face 17c which is substantially complementary with the face 16c of the die. The draw face 16c represents a truncated portion of a 160° circular cone where it intercepts the face of the die, the generative axis of which coincides with the axis of the die cavity and of course the truncated portion matches the mating surface 17c of the blank holder. The opposed or matching faces 16c and 17c are illustrated as having a 10° slope or inclination with respect to the perpendicular of the axis of draw.

A punch 18 is provided with a mounting stem 18a and a shaped forming head 18b which has a spherical radius. A line of parting 18c between the portions 18a and 18b has a curvature that matches a rectangular section of a 160° circular cone whose axis coincides with the perpendicular or the axis of the punch.

Figure 8A shows the shape of the parts of the apparatus of Figure 7 taken along a major transverse axis of the blank, while Figure 8B shows the corresponding shape taken along the minor or end axis of the blank and this is carried through as to Figures 9A and 9B and Figures 10A and 10B. After the blank 1 has been positioned as indicated in Figures 8A and 8B, clamping and shaping (compression) force is applied between the die 16 and the blank holder 17 to first deform an outer bounding part 2a in a declining plane to the axis of the draw and provide a preliminary shape 2, see Figures 9A and 9B. Then, relative movement is effected between the punch 18 and parts 16 and 17 to draw out the central portion of the blank to provide the shape 3, see Figures 10A and 10B. It will be noted that an inner portion of the outer bounding part 2a and the central part of the blank 2 are given a relatively shallow draw attenuation under tension, thereby shortening the part 2a and providing the preliminary shape 3 having an enlarged central body part and a shortened outer bounding part 3a. At this time, the punch or the draw force 18 may be withdrawn, holddown released, and the shape 3 is pushed out by the knockout 19. This completes the first drawing operation.

In the next or second drawing operation, I employ the apparatus shown in Figures 11 to 13, inclusive. The shape 3, as formed by the first drawing operation is positioned as shown in Figure 12 and drawn into shape 4 of Figure 13, in the manner indicated. At this time, the shortened outer bounding part 3a is held under compression force while the enlarged central body part and an inner portion of the part 3a are given a relatively deep draw attenuation under tension. As a result, the part 3a is further shortened to form the part 4a and the shape 4 now has a final cone-shaped enlarged central part. The apparatus employed consists of a die 20 having a mounting flange 20a, a bore 20b and a planar face 20c. A draw ring part 21 is mounted on the face 20c of the die by suitable means, such as cap screws (not shown), to project downwardly therefrom. The part 21, like the die 16 of the apparatus employed in the first operation has an outwardly-declining draw face 21c which is in an opposed relationship with respect to an outwardly-declining mating face 22c of a blank holder 22. The blank holder 22 has a mounting flange 22a and a bore 22b of the same diameter as a bore 21b of the part 21. The previously formed shape 3 is adapted to rest between such faces and to be securely held therebetween. The part 21 has a draw bore 21a and the draw ring projection or bore 21b. This projection, as shown in Figure 13, is employed to round out a flange or outer bounding part 4a of shortened width which is formed by this operation, thereby strengthening the shape, while at the same time permitting it to be further and deeper drawn in its middle by a drop punch 23 to produce the final draw shape 4.

The punch 23 has a mounting portion 23a, a shaped head 23b and a shaped tip 23c. The tip 23c is flattened on its bottom, but curved on its sides, and may be mounted on the portion 23b by cap screws, not shown. Assuming that a 17 inch cone is being formed, the draw effected in the second operation will be approximately 7 and ⅞ inches deep.

In Figures 14 to 16 inclusive, I have illustrated a third operation of my invention wherein, the drawn cone 4 is formed substantially into its final shape 5. In this operation, the further shortened bounding part or flange 4a is die-formed into the final rounded-rectangular shaped lip 14 and a bottom portion of the enlarged cone-shaped central part is die-formed into a band 5a and a circular portion 5b.

The apparatus employed has a forming die 24, a forming ring part 25, a knockout-bottom core part 27, and a forming punch 28. The die 24 is provided with a bore 24a, a radially-inwardly extending flange portion 24b, a face 24c, and a bottom knockout-receiving bore 24d.

The bottom-forming part or core 27 has an upper face consisting of a depressed circular middle portion 27a, an upwardly curved portion 27b, and a top rim portion 27c which lies substantially in the plane of the flange 24b of the die. The punch 28 has a mounting flange 28a, a shaped head portion 28b, and a shaped tip portion 28c and an offset portion 28d.

The part 25 is secured on the die face 24c by suitable means, such as by cap screws (not shown), and has a bore 25a which extends inwardly slightly beyond the die bore 24a and terminates in an inwardly-declining edge face 25b. The edge face 25b is connected at its apex to a depressed portion 25c within which a key part 26 is secured as by cap screws.

The key part 26 has a top, substantially planar face 26c connected by a depressed step to an outwardly-declining face portion 26b and an inner, depressed step 26a. As shown in Figure 15, the blank 4 is a positioned with its flange 4a resting upon the portion 26b against its first step and projects over the portion 25b, along the bore 25a, towards the part 27.

When the forming punch 28 is applied, as shown in Figure 16, the bottom of the shape 4 is forced downwardly upon the portions 27a and 27b and the flange 4a now becomes the completed upper lip 14 of Figures 4 and 16. That is, the flange 4a is given a double bend by this operation and is moved downwardly on the offset face 26b against the abutment edge or step 26a and against the bore 25a, thus resulting in the final lip shape 14. As shown in Figure 16, the lower lip band 5a of the one 5 is shaped by the part 27; and after the circular portion 5b is pierced out, as shown in Figure 17 the finished lower lip 13 of Figure 4 is provided. In effecting the latter operation, I employ piercing die 29, a piercing punch 30, and an inside (spring-held) die or punch guide 31.

As will be apparent from the evaluation of the procedure employed in making the television cone of my invention, its main body (the walls 11 and 12) and its bottom lip 13 are of substantially the same uniform thickness throughout, while the top lip 14 will have a slightly greater thickness. As a result, such top lip 14 which bounds the major dimension of the cone strengthens it and provides a reinforcing portion for receiving the glass face plate 15. The need for the usual spun strengthening band about the side walls 11 and 12 and adjacent the lip 14 has been eliminated.

It thus appears that in accordance with my procedure, the relatively thin sheet metal blank 1 is first or preliminarily deformed to decline outwardly from its outer bounding part (see Figures 9A and 9B). In the first drawing operation (see Figures 10A and 10B), the outer bounding part of the deformed blank 2 is held under compression while the central part of the blank is draw-attenuated along an inner portion of the outer bounding part to form a hollow shape 3; it is apparent that in this operation the outer bounding part is shortened in its extent while the central part is enlarged, both by the attenuation and by the adding to it an inner portion of the outer bounding part. In this second drawing operation, see Figure 13, the central part of the shape 3 is unsupported, except by the shortened bounding part which of course, is held under compression during the drawing operation and is further shortened as the central body part and an additional inner portion of the bounding part are attenuated. The final bounding part which may be termed the flange 4a of the shape 4 is then die-pressed or formed into the final lip 14 of the cone while an offset bottom band 5a of the central part is formed in a like manner. Thus, the piercing out of the bottom portion 5b of the central part of the shape 5 produces the bottom or lower lip 13 of the completed television cone.

It will be noted that the illustrated apparatus is shown as employing what may be termed a "developed" blank or one which by determination contains substantially the correct amount of metal to give a finished product without any additional trimming operation. Some slight top lip edge trimming may be employed if necessary, depending upon the type of face plate to be employed. If a non-developed blank is used, the top edge of the blank may be of excessive length and as a result, I either straight-trim it with trimming dies (not shown) after the second drawing operation or pinch trim it with dies after the final forming operation. In the latter case, as shown in Figures 18, 19, and 20, I have been able to provide a stiffened lip edge 14'c from a cone 10 which has been made in accordance with my invention and which after the final forming operation of Figure 16 has a somewhat horizontal extending portion a, see Figure 18. The portion a is trimmed off as indicated by the arrow of Figure 18 to provide the slightly outwardly curved thickened edge 14'c. The burr b is then filed or abraded off to round the edge and provide the finished lip 14' of Figure 20; if desired, the edge may also be straightened slightly towards the vertical. In this figure, portions 14'a and 14'b correspond to the portions 14a and 14b of the lip 14 of the cone of Figure 5.

Although I have, for the purpose of simplified illustration, shown a spherical type of face plate 15 which is the type now in general use, the top lip 14 or 14' may be shaped and trimmed to receive a cylindrical or a planar type.

I claim:

1. A method of making a rectangular cone shaped metal envelope from a single relatively thin sheet metal blank which comprises the steps of providing a first drawing assembly including a first rigid draw punch, a first draw die and a first blank holder with complementary outwardly declining draw faces formed between said first draw die and said first blank holder, positioning said metal blank between said complementary faces, applying a clamping and shaping force between said first die and said first blank holder and deforming an outer bounding part of said blank backwardly at an outwardly declining angle of about 10° with a plane taken at right angles to the axis of the drawing operation and with respect to a central part of the blank, then holding the deformed outer bounding part under compression between said complementary outwardly declining draw faces while subjecting the central part and an inner portion of the bounding part to a relatively shallow draw attenuation under tension and thereby shortening the outer bounding part and providing a preliminary shape having an enlarged central part; providing a second drawing assembly including a second draw die having a draw ring portion along the top surface thereof and a second blank holder with second complementary outwardly declining draw faces having an angle of about 13° with a plane taken at right angles to the axis of the drawing operation provided between said draw ring portion and said second blank holder, positioning the shortened outer bounding part between said second complementary faces, holding the shortened outer bounding part under compression between said second outwardly declining faces while subjecting the enlarged central part and an inner portion of the shortened outer bounding part to a relatively deep draw attenuation under tension and thereby further shortening the outer bounding part and providing a final cone shaped enlarged central part; and thereafter die forming the further shortened outer bounding part into a rounded rectangular shaped lip and the bottom portion of the cone shaped enlarged central part into an outwardly offset band.

2. In a method as defined in claim 1 wherein the further shortened outer bounding part and a bottom portion of the cone shaped enlarged central part are die formed by the steps comprising providing a forming assembly including a rigid forming punch and a forming die having a ring portion along the top surface thereof and a knock-out bottom core part recessed in the bottom portion thereof, said ring portion having a key part secured thereto, positioning the further shortened outer bounding part on said key part, applying said forming punch to said forming die thereby die forming the further shortened outer bounding part into a rounded rectangular shaped lip and a bottom portion of the cone shaped enlarged central part into an outwardly offset band; and finally piercing said bottom portion along said band to form a bottom lip.

References Cited in the file of this patent

UNITED STATES PATENTS

| | | |
|---|---|---|
| 671,427 | Anderson | Apr. 9, 1901 |
| 1,568,283 | Kuen | Jan. 5, 1926 |
| 1,715,683 | Stevens | June 4, 1929 |
| 2,014,815 | Rutledge | Sept. 17, 1935 |
| 2,136,933 | Calleson | Nov. 15, 1938 |
| 2,232,098 | Deichman | Feb. 18, 1941 |
| 2,415,940 | Eckstein | Feb. 18, 1947 |
| 2,422,883 | Bruderlin | June 24, 1947 |
| 2,682,963 | Faulkner | July 6, 1954 |